United States Patent
Ebert et al.

(10) Patent No.: US 9,079,357 B2
(45) Date of Patent: Jul. 14, 2015

(54) METHOD FOR THE LAYERED CONSTRUCTION OF A SHAPED BODY MADE OF HIGHLY VISCOUS PHOTOPOLYMERIZABLE MATERIAL

(75) Inventors: Jörg Ebert, Buchs (CH); Johannes Homa, Grosspetersdorf (AT); Jürgen Laubersheimer, Buchs (CH); Johannes Patzer, Vienna (AT); Jürgen Stampfl, Vienna (AT); Wolfgang Wachter, Schaan (LI)

(73) Assignees: Ivoclar Vivadent AG, Schaan (LI); Technische Universität Wien, Vienna (AT)

( * ) Notice: Subject to any disclaimer, the term of this patent is extended or adjusted under 35 U.S.C. 154(b) by 548 days.

(21) Appl. No.: 13/428,948

(22) Filed: Mar. 23, 2012

(65) Prior Publication Data

US 2012/0248657 A1 Oct. 4, 2012

(30) Foreign Application Priority Data

Mar. 29, 2011 (EP) ..................................... 11160145

(51) Int. Cl.
*B29C 67/00* (2006.01)
*B29C 41/12* (2006.01)
*B29C 41/36* (2006.01)

(52) U.S. Cl.
CPC ......... *B29C 67/0062* (2013.01); *B29C 67/0085* (2013.01); *B29C 41/12* (2013.01); *B29C 41/36* (2013.01); *B29C 67/0051* (2013.01); *B29C 67/0055* (2013.01)

(58) Field of Classification Search
CPC ............ B29C 67/0051; B29C 67/0055; B29C 67/0066; B29C 67/007; B29C 41/12; B29C 41/36; B29C 67/0085; B29C 67/0062; B29C 67/008
USPC ........ 264/401, 494, 496; 425/174.4; 366/255, 366/256, 332–335; 427/430.1, 492, 498, 427/510, 512; 118/100, 103, 120, 400, 413, 118/421
See application file for complete search history.

(56) References Cited

U.S. PATENT DOCUMENTS

| | | | |
|---|---|---|---|
| 3,980,017 A * | 9/1976 | Black .............................. | 101/129 |
| 5,174,931 A * | 12/1992 | Almquist et al. ............. | 264/401 |
| 5,474,719 A * | 12/1995 | Fan et al. ...................... | 264/401 |
| 6,051,179 A * | 4/2000 | Hagenau ....................... | 264/401 |
| 6,153,142 A * | 11/2000 | Chari et al. ................... | 264/401 |
| 2010/0283188 A1 * | 11/2010 | Rohner et al. ................ | 264/401 |

FOREIGN PATENT DOCUMENTS

| | | |
|---|---|---|
| EP | 0 484 086 A1 | 5/1992 |
| EP | 0 597 114 A1 | 5/1994 |
| WO | WO 98/06560 A1 | 2/1998 |
| WO | WO 2010/045950 A1 | 4/2010 |

* cited by examiner

*Primary Examiner* — Monica Huson
*Assistant Examiner* — Hannuri L Kwon
(74) *Attorney, Agent, or Firm* — Ann M. Knab; Thad McMurray

(57) ABSTRACT

The invention relates to a method for the layered construction of a shaped body made of highly viscous photopolymerizable material.

18 Claims, 3 Drawing Sheets

METHOD FOR THE LAYERED CONSTRUCTION OF A SHAPED BODY MADE OF HIGHLY VISCOUS PHOTOPOLYMERIZABLE MATERIAL

CROSS-REFERENCE TO RELATED APPLICATIONS

This application claims the benefit of EP 11160145.6 filed Mar. 29, 2011, which is hereby incorporated by reference in its entirety.

TECHNICAL FIELD

The present invention relates to a method for the layered construction of a shaped body made of highly viscous photopolymerizable material.

BACKGROUND

CAD-CAM techniques have already been adopted in the field of dentistry for some time, and are replacing the traditional manual production of dentures. The currently usual machining production methods for producing ceramic dental restoration bodies have, however, some disadvantages which cannot be improved according to the current prior art with acceptable outlay within economic constraints. In this context generative production methods, known by the term "rapid prototyping", may be envisaged, in particular stereolithographic methods in which a newly applied material layer is respectively polymerized in the desired shape by position-selective exposure, so that the desired body is produced successively by layered shaping in its three-dimensional shape, which is defined by the sequence of applied layers.

Filled photopolymerizable materials, in particular ceramic-filled materials, are important as materials to be processed for dental restorations. In relation to the processing of ceramic-filled photopolymers, reference may be made for example to the prior art according to WO 98/06560 A1. In the method described therein, a ceramic slurry is exposed through a dynamic mask (light modulator) and thereby cured, so that a three-dimensional shaped body can be constructed successively layer by layer. In the described method, the ceramic slurry is exposed from above on a production platform. With such exposure from above, a new thin material layer must be applied with the aid of a blade after each exposure (typically with a layer thickness which lies between 10 and 100 µm). For highly viscous photopolymerizable materials, such as ceramic-filled resins are, thin layers can however be applied reproducibly only with difficulty in this way.

A method of the type mentioned in the introduction is described in WO 2010/045950 A1 and corresponding US Published Application No. US2011310370, which is hereby incorporated by reference. The method is used for the layered construction of a shaped body by using lithography-based generative manufacture, for example rapid prototyping. A defined layer of photopolymerizable material, which is contained in a tank having a horizontal bottom formed so as to transmit light at least in subregions, is formed in the following way. A production platform which is vertically moveable in a controlled manner is supported by a lifting mechanism and is arranged on the tank so that it can be raised and lowered by the lifting mechanism under the control of a control unit. By lowering the production platform into the photopolymerizable material in the tank, material is displaced from the gap between the lower side of the production platform and the tank bottom. By accurate setting of the vertical position of the production platform, a layer of photopolymerizable material with an accurately defined layer thickness can thus be produced between the lower side of the production platform and the tank bottom. The layer of photopolymerizable material defined in this way is then exposed in the desired geometry by position-selective exposure from below through the light-transmitting tank bottom, so as to cure the layer on the production platform. The production platform with the first layer cured thereon is subsequently raised and the exposed region is replenished with photopolymerizable material, since the material cannot readily flow back from the surrounding regions of the tank into the exposed region. The production platform is then re-lowered, so as again to define a layer of photopolymerizable material with a predetermined layer thickness between the lower side of the cured layer and the tank bottom. These steps are repeated so as to construct layer by layer the shaped body consisting of successive layers, each with a predetermined geometry.

After a layer has been cured, the production platform with the part of the shaped body already formed thereon is raised. In the region exposed to form the last layer, a free space or "hole" then remains over the tank bottom, since the material previously contained there in the defined layer of photopolymerizable material has been cured by the last exposure and raised vertically with the production platform. In the case of highly viscous filled photopolymerizable material, in particular oxide ceramic-filled or glass ceramic-filled polymers, the problem arises that the resulting "hole" in the exposed region must be refilled with photopolymerizable material since, owing to its high viscosity, the highly viscous material cannot readily flow back from the surrounding regions as would be the case with unfilled photopolymerizable materials. To this end, in WO 2010/045950 and corresponding US Published Application No. US2011310370, which is hereby incorporated by reference, a blade is provided and is moved relative to the tank with a predetermined distance from the lower edge of the blade to the tank bottom, so as to move photopolymerizable material from regions outside the region in the tank exposed last into the free space remaining after raising the last cured layer. Here, the blade functions as a displacement element in order to transport photopolymerizable material into the free space left behind; it is not, however, used in order to define the layer thickness since the layer thickness of the layer to be formed next is set by lowering the production platform with the shaped body part adhering thereon into the photopolymerizable material to a predetermined distance from the tank bottom. The use of a blade for moving highly viscous photopolymerizable material in order to refill the previously exposed region has not proven effective.

SUMMARY

It is therefore an object of the present invention to improve a method of the type defined in the introduction so that free spaces in the material distribution in the tank in the exposed region can be replenished effectively with photopolymerizable material. The features of the patent claims are incorporated herein by reference.

The present invention relates to a method for the layered construction of a shaped body made of highly viscous photopolymerizable material, in which a production platform, on the lower side of which the first layer of the shaped body to be constructed is cured, is lowered into a tank into the photopolymerizable material to a height determined so that a layer of photopolymerizable material with a predetermined layer thickness is defined between the lower side of the production platform or, if already present, the lowest cured layer of the shaped body part formed thereon and the tank bottom, the layer is exposed and cured in the desired shape by selective exposure from below through a transparent tank bottom, the production platform is raised again, the exposed region below the raised platform is replenished with photopolymerizable material and the preceding steps are repeated until the last layer of the shaped body is formed.

According to the invention, in order to replenish the exposed region below the production platform with photopolymerizable material, an elongate mixing element is moved essentially transversely to its longitudinal direction over the tank bottom, relative thereto, below the production platform through the exposed region. The mixing element has dimensions, and is moved in a positioned fashion, in such a way that the upper edge of the mixing element remains below the material level of the photopolymerizable material outside the exposed region in the tank, at least along a part of its length. The elongate mixing element may, for example, be a thin elongate rod or a wire. The upper edge of the elongate mixing element lies below the material level in the tank, i.e. photopolymerizable material can flow over the upper edge of the elongate mixing element when the elongate mixing element is moved through the tank. This means that the elongate mixing element does not act like a slide or blade which pushes material in front of it and leaves behind a layer of defined thickness, which is determined by the distance from the lower edge of the blade to the tank bottom. In connection with the present invention, it has been found that an elongate mixing element which is moved through the tank below the surface of the material level, close to the tank bottom or in contact therewith, is highly effective in entraining the highly viscous material into the region of the free space below the raised shaped body part. With this initial entrainment of material and when photopolymerizable material flows over the elongate mixing element, the photopolymerizable material is also agitated or stirred to a certain extent, in order to flow back into the free space. To this extent, the moved elongate mixing element also functions here as an element to stimulate the flow movement of photopolymerizable material back into the free space which has been created.

The movement of the mixing element need not take place strictly perpendicularly to its longitudinal direction. Other movements may be superimposed on the perpendicular movement. A rotating movement or tilting movement (comparable to a windscreen wiper) are also possible, since here again each element of the mixing element outside the rotation point moves perpendicularly to its longitudinal axis at any time.

In an advantageous embodiment, the elongate mixing element may be moved in a positioned fashion in such a way that the lower edge of the mixing element is in contact with the tank bottom during its movement parallel to the tank bottom. As an alternative, the lower edge of the elongate mixing element may also be moved in a positioned fashion in such a way that it is at a predetermined distance from the tank bottom during its movement parallel thereto. The effect of the former procedure is that material aggregations possibly adhering to the tank bottom are detached and introduced into the flowing material. In this case, it may also be provided that the elongate mixing element is provided with a resilient sealing or stripping lip which, during the movement of the elongate mixing element over the tank bottom, is moved over the tank bottom while bearing on it.

In an advantageous embodiment, the elongate mixing element comprises a wire, in particular a metal wire, which is held parallel to the tank bottom, over it and movably relative thereto. The wire may have a diameter in the range of from 0.1 mm to 1 mm.

It is furthermore preferable for the elongate mixing element to be resistively heatable and to be resistively heated during the movement over the tank bottom in order to increase the local temperature of the surrounding photopolymerizable material and thereby reduce its viscosity.

The movement of the elongate mixing element relative to the tank bottom is carried out either by a driven movement of the elongate mixing element along a horizontal plane with respect to a stationary tank or, with an elongate mixing element held stationary, by moving the tank in a horizontal plane with respect to the elongate mixing element.

In principle, it may be sufficient for the elongate mixing element to be moved once over the tank bottom so that it passes once through the region of the raised shaped body part. In an advantageous embodiment, however, the elongate mixing element is also moved back into its starting position once, so that it passes through the region of the shaped body part on the production platform twice. Multiple to-and-fro movements may also be advantageous.

In a preferred embodiment, an oscillating movement of the elongate mixing element along its longitudinal direction may be superimposed on the movement of the elongate mixing element essentially transversely to its longitudinal direction, so that the elongate mixing element so to speak executes a zigzag movement over the tank bottom. In this way, photopolymerizable material which lies in the side edges around the free space below the raised shaped body part, which are essentially transverse to the longitudinal direction of the mixing element, can also be included in the process. With a movement over the tank bottom taking place exclusively perpendicularly to the longitudinal direction of the elongate mixing element, predominantly material which lies in front of and behind the free space in the movement direction is included.

Preferably, the frequency of the oscillating movement of the elongate mixing element is so great that the elongate mixing element is moved several times to and fro along its longitudinal direction while it passes once through the region below the shaped body part of the production platform.

The elongate mixing element may have a constant cross-sectional shape along its length, i.e. it may form a rod or a wire with equal transverse dimensions. In an alternative advantageous embodiment, the elongate mixing element may be provided with profiling of its cross-sectional shape along its length, i.e. it may be provided with widened parts at regular or irregular intervals along its length.

As an alternative, the elongate mixing element may have a cross-sectional shape which is constant lengthwise and thus be provided in the form of an elongate rod which has a round, triangular or polygonal cross-sectional shape or which is formed as an L-, U-, or O-shaped profile.

In another advantageous embodiment, the elongate mixing element may comprise a plurality of parallel wires, which are moved over the tank bottom while being held lying one behind the other at the same height above the tank bottom or at different heights above the tank bottom.

BRIEF DESCRIPTION OF THE DRAWINGS

The invention will be described below in exemplary embodiments with reference to the drawings, in which.

DETAILED DESCRIPTION

Figure 1:
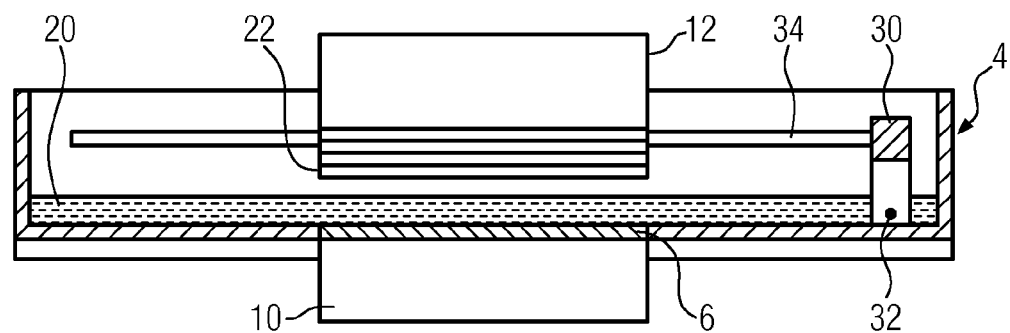
FIGS. 1 to 4 show schematic lateral sectional views of a device for carrying out the method in successive phases of the method sequence.
Figure 2:
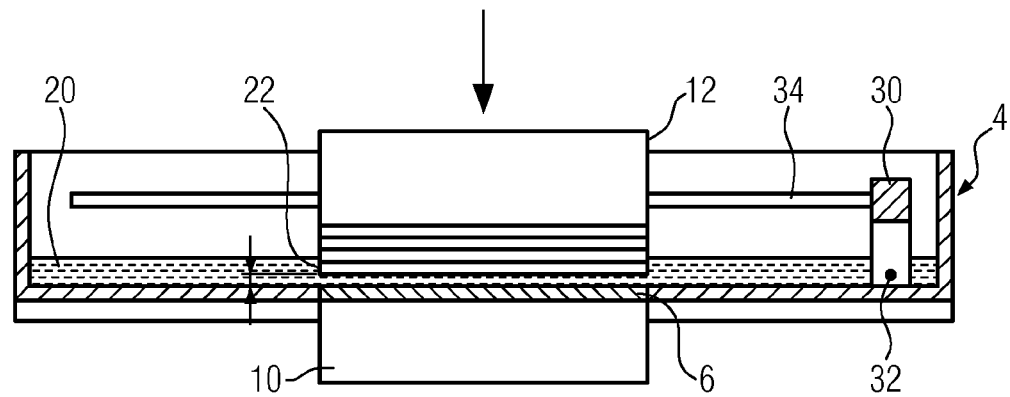

The functionality of a device for carrying out a method of the present invention will first be described with reference to FIGS. 1 to 3. The device comprises a tank 4, the tank bottom of which is transparent or translucent at least in a subregion 6. This subregion 6 of the tank bottom covers at least the extent of an exposure unit 10, which is arranged below the tank bottom. The exposure unit 10 comprises a light source and a light modulator with which the intensity can be adjusted position-selectively under the control of a control unit, in order to produce an exposure field on the tank bottom 6 with the geometry desired for the layer currently to be formed. As an alternative, a laser may be used in the exposure unit, the light beam of which successively scans the exposure field with the desired intensity pattern by means of a mobile mirror, which is controlled by a control unit.

Opposite the exposure unit 10, a production platform 12 is provided above the tank 4; it is supported by a lifting mechanism (not shown) so that it is held in a height-adjustable way over the tank bottom 6 in the region above the exposure unit 10. The production platform 12 may likewise be transparent or translucent in order that light can be shone in by a further exposure unit above the production platform in such a way that, at least when forming the first layer on the lower side of the production platform 12, it can also be exposed from above so that the layer cured first on the production platform adheres thereto with even greater reliability.

The tank 4 contains a filling of highly viscous photopolymerizable material 20. The material level of the filling is much higher than the thickness of the layers which are intended to be defined for position-selective exposure. In order to define a layer of photopolymerizable material, the following procedure is adopted. The production platform 12 is lowered by the lifting mechanism in a controlled way so that (before the first exposure step) its lower side is immersed in the filling of photopolymerizable material 20 and approaches the tank bottom 6 to such an extent that precisely the desired layer thickness Δ (see FIG. 2) remains between the lower side of the production platform 12 and the tank bottom 6. During this immersion process, photopolymerizable material is displaced from the gap between the lower side of the production platform 12 and the tank bottom 6. After the layer thickness Δ has been set, the desired position-selective layer exposure is carried out for this layer, in order to cure it in the desired shape. Particularly when forming the first layer, exposure from above may also take place through the transparent or translucent production platform 12, so that reliable and complete curing takes place particularly in the contact region between the lower side of the production platform 12 and the photopolymerizable material, and therefore good adhesion of the first layer to the production platform 12 is ensured. After the layer has been formed, the production platform is raised again by means of the lifting mechanism.

These steps are subsequently repeated several times, the distance from the lower side of the layer 22 formed last to the tank bottom 6 respectively being set to the desired layer thickness Δ and the next layer thereupon being cured position-selectively in the desired way.

Figure 3:
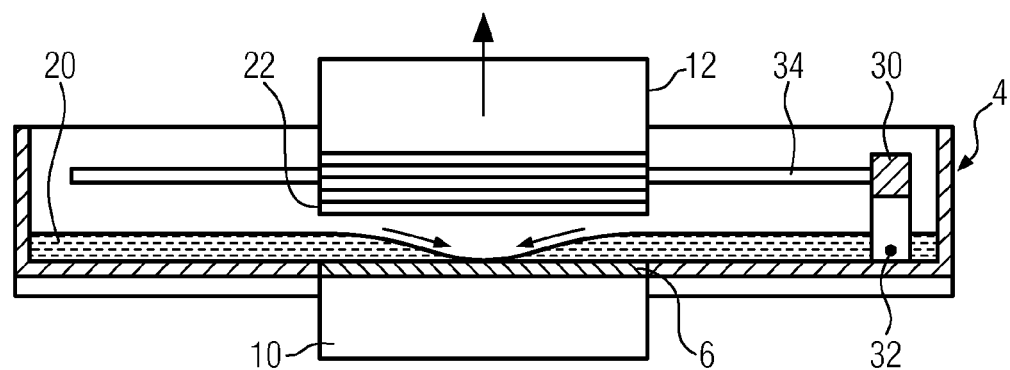

After the production platform 12 has been raised following an exposure step, there is a material deficit in the exposed region as indicated in FIG. 3. This is because after curing the layer set with the thickness Δ, the material of this layer is cured and raised with the production platform and the part of the shaped body already formed thereon. The photopolymerizable material therefore missing between the lower side of the already formed shaped body part and the tank bottom 6 must be filled from the filling of photopolymerizable material 20 from the region surrounding the exposed region. Owing to the high viscosity of the material, however, it does not flow by itself back into the exposed region between the lower side of the shaped body part and the tank bottom, so that material depressions or "holes" can remain here.

Figure 4:
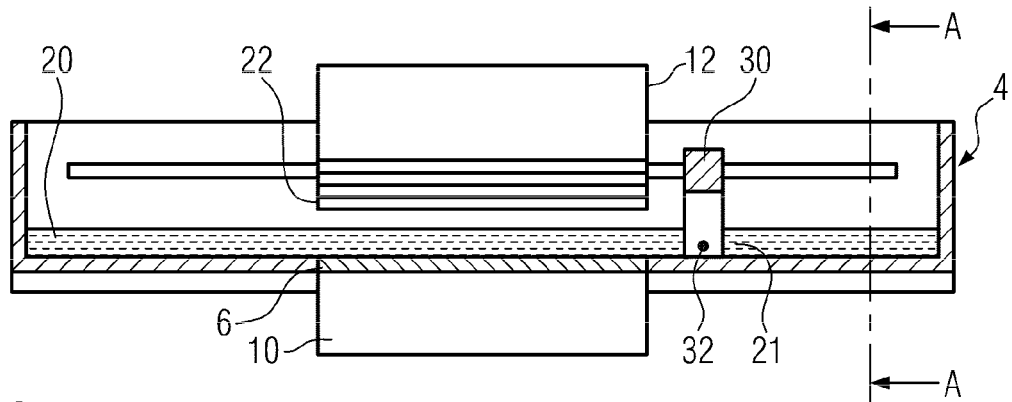

In order to replenish the exposure region with photopolymerizable material, according to the invention an elongate mixing element 32 is moved through the filling of photopolymerizable material 20 in the tank. In the exemplary embodiment represented in FIGS. 1 to 5, the mixing element 32 comprises an elongate wire which is tensioned between two support arms 30 mounted movably on the side walls of the tank 4. The support arms 30 may be mounted movably in guide slots 34 in the side walls of the tank 4, so that the wire 32 tensioned between the support arms 30 can be moved relative to the tank 4, parallel to the tank bottom 6, by moving the support arms 30 in the guide slots 34. The elongate mixing element 32 has dimensions, and its movement is guided relative to the tank bottom, such that the upper edge of the elongate mixing element 32 remains below the material level of the filling of photopolymerizable material 20 in the tank outside the exposed region. As can be seen in the sectional view of FIG. 5, the mixing element 32 is below the material level in the tank over the entire length of the wire, and only the support arms 30 protrude beyond the material level in the tank. The effect of arranging the elongate mixing element below the material level in the tank 4 is not that the elongate mixing element 32 substantially moves material in front of it during its movement relative to the tank through the exposed region, but rather this material flows over the mixing element 32 while executing a slight upward movement, as indicated by the arrow 21 in FIG. 4. It has been found that by this type of action on the photopolymerizable material in the tank, it is effectively stimulated to flow back into the material-depleted exposed region between the production platform 12 and the exposure unit 10.

Figure 6:
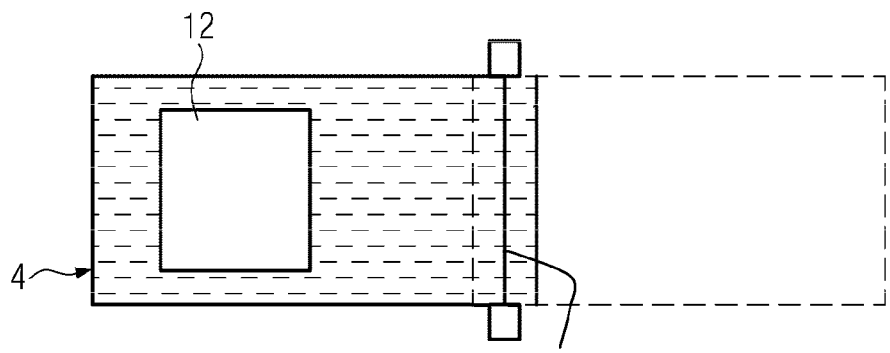
FIG. 6 shows a schematic view of the device of FIGS. 1 to 5 from above.

The movement of the elongate mixing element 32 relative to the tank may firstly, with a stationary tank 4, be carried out by a linear drive which moves the support arms 30 along the guide slots 34 in order to achieve the desired movement of the elongate mixing element 32 through the exposed region between the production platform 12 and the exposure unit 10. As an alternative, the elongate mixing element 32 may be held stationary in space while the tank 4 is mounted horizontally movably and is displaced to and fro by a drive, as indicated in FIG. 6 in which the tank 4 is shown in an end position of the movement by solid lines while the opposite position of the tank is indicated by dashes lines.

Figure 5:
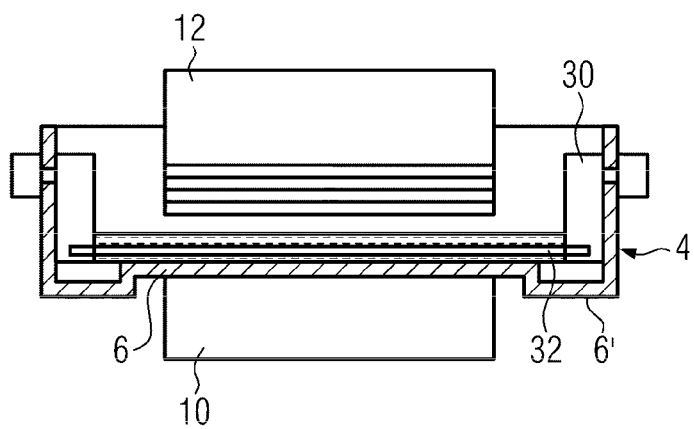
FIG. 5 shows a schematic sectional view along the line A-A of FIG. 4.

As shown in FIG. 5, the tank bottom 6 has recesses 6' on both sides. The support arms 30 project with their lower ends into these recesses 6'. This makes it possible for the elongate mixing element 32 to be held at the height of the tank bottom 6, without interfering with the movement of the lower ends of the support arms 30 through the tank bottom 6.

Figure 7:
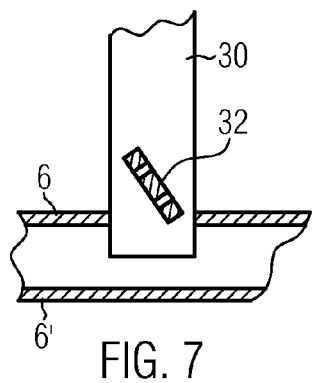
FIGS. 7 to 11 show schematic partial views of the device of FIGS. 1 to 5 in section, which illustrate different embodiments of the configuration of the mixing element used in the present invention.

FIGS. 7 to 11 show other embodiments of the elongate mixing element 32 in detailed views in section. FIG. 7 shows the lower end region of a support arm 30. The tank bottom 6 and the bottom in the region of the recesses 6' are also indicated. In the exemplary embodiment of FIG. 7, the elongate mixing element 32 comprises a flat elongate plate which is placed obliquely and has a multiplicity of openings in its surface, through which the photopolymerizable material can flow. The elongate plate is moreover arranged so that its upper edge remains below the material level in the tank.

Figure 8:
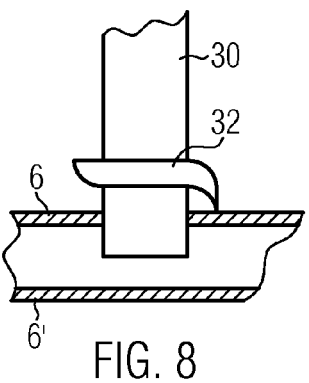

The mixing element 32 represented in FIG. 8 comprises a more horizontally arranged elongate plate 32, on the end of which there is a wiping or stripping lip 32 made of resilient material. In this exemplary embodiment, the elongate mixing element 32 having the resilient stripping lip 33 is moved over the tank bottom while bearing thereon in order to entrain any adhesions on the tank bottom.

Figure 9:
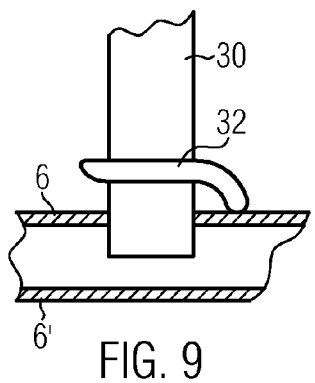

In the exemplary embodiment in FIG. 9, the elongate mixing element 32 comprises a wing-like profile. This curved contour of the elongate mixing element 32 induces an increased vertical movement of the photopolymerizable material as it passes through, which leads to improved flow of the material along and back into the region to be filled.

Figure 10:
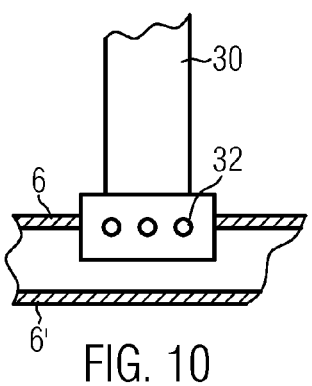
Figure 11:
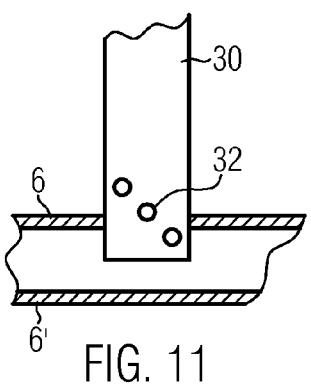

In the exemplary embodiment in FIG. 10, the elongate mixing element 32 comprises three metal wires placed horizontally in succession, while in the exemplary embodiment according to FIG. 11 three metal wires placed in succession are moved over the tank bottom at different heights. Forming the elongate mixing element with a plurality of wires placed in succession leads to increased material movement while the multiplicity of wires are moved through the material.

Figure 12:
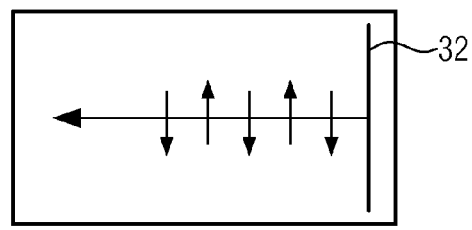
FIG. 12 shows a schematic plan view from above of a device for carrying out the method, which illustrates an example of a possible way of moving the mixing element.

FIG. 12 shows a schematic representation of a possible way of moving the elongate mixing element 32. The elongate mixing element is moved on the one hand transversely to its longitudinal direction through the tank, which is indicated by the long horizontal arrow. An oscillating movement in the longitudinal direction of the elongate mixing element 32 is superimposed on this movement transverse to the longitudinal direction. This superposition of an additional movement component leads to better incorporation when replenishing material from all regions of the material filling in the tank. The frequency of the oscillating movement in the longitudinal direction of the elongate mixing element 32 should be high enough that a plurality of to-and-fro movements in the longitudinal direction take place during a movement of the longitudinal mixing element transversely to its longitudinal direction through the tank. In principle, it is also conceivable to superimpose a further rapidly oscillating movement of the elongate mixing element 32 transversely to its longitudinal direction on the movement transverse to the longitudinal direction of the elongate mixing element 32, so that besides the movement transversely through the tank a rapid to-and-fro movement forward and backward is executed so as to improve the material entrainment.

The elongate mixing element 32 should be moved through the tank at least once through the exposed region. It is, however, also possible for the elongate mixing element 32 to be moved back through the exposed region or for a multiple to-and-fro movement to be executed.

In preferred embodiments, the elongate mixing element may also be formed as a resistive heating element. Heating the elongate mixing element leads to local heating of the photopolymerizable material in the vicinity of the elongate mixing element, so that the viscosity of the material around the elongate mixing element is reduced, making it easier for the material to be drawn and flow back into the region to be filled.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. Method for a layered construction of a shaped body made of highly viscous photopolymerizable material, in which a production platform, on a lower side of which a first layer of the shaped body to be constructed is cured, is lowered into a tank into the photopolymerizable material to a height determined so that a layer of photopolymerizable material with a predetermined layer thickness is defined between the lower side of the production platform or, if already present, a lowest cured layer of the shaped body part formed thereon and a tank bottom, the layer is exposed and cured in a desired shape by selective exposure from below through a transparent tank bottom, the production platform is raised again, an exposed region below the raised platform is replenished with photopolymerizable material and the preceding steps are repeated until a last layer of the shaped body is formed, wherein in order to replenish the exposed region below the production platform with photopolymerizable material, an elongate mixing element is moved essentially transversely to its longitudinal direction over the tank bottom, relative thereto, below the production platform through the exposed region, and wherein the mixing element has dimensions, and is moved in a positioned fashion, such that the upper edge of the mixing element remains below a material level of the photopolymerizable material, which exists outside the exposed region in the tank, at least along a part of its length, and wherein an oscillating movement of the elongate mixing element along its longitudinal direction is superimposed on movement of the elongate mixing element essentially transversely to its longitudinal direction.

2. Method for the layered construction of a shaped body according to claim 1, wherein the elongate mixing element is moved in a positioned fashion in such a way that the lower edge of the mixing element is in contact with the tank bottom during its movement parallel to the tank bottom.

3. Method for the layered construction of a shaped body according to claim 1, wherein the elongate mixing element is moved in a positioned fashion in such a way that the lower edge of the mixing element is at a predetermined distance from the tank bottom during its movement parallel thereto.

4. Method for the layered construction of a shaped body according to claim 1, wherein the elongate mixing element comprises a wire, which is held parallel to the tank bottom, over the tank bottom and movably relative thereto.

5. Method for the layered construction of a shaped body according to claim 4, wherein the wire comprise a metal wire.

6. Method for the layered construction of a shaped body according to claim 4, wherein the wire has a diameter in the range of from 0.1 mm to 1 mm.

7. Method for the layered construction of a shaped body according to claim 1, wherein the elongate mixing element is resistively heatable and is resistively heated during the movement below the shaped body part in order to increase the local temperature of the surrounding photopolymerizable material and thereby reduce its viscosity.

8. Method for the layered construction of a shaped body according to claim 1, wherein in order to replenish the photopolymerizable material, the elongate mixing element is moved with respect to a stationary tank through the region of the production platform over the tank bottom.

9. Method for the layered construction of a shaped body according to claim 1, wherein in order to replenish the photopolymerizable material, the tank is moved with respect to a stationary elongate mixing element, such that the elongate mixing element is moved through the region of the production platform over the tank bottom.

10. Method for the layered construction of a shaped body according to claim 1, wherein the elongate mixing element is moved through below the shaped body part on the production platform at least twice in order to replenish the photopolymerizable material.

11. Method according to claim 1, wherein the frequency of the oscillating movement of the elongate mixing element is so great that the elongate mixing element is moved several times to and fro along its longitudinal direction while it passes once through the region below the shaped body part of the production platform.

12. Method for the layered construction of a shaped body according to claim 1, wherein the elongate mixing element comprises regions with an enlarged cross section and a reduced cross section alternating along its length.

13. Method for the layered construction of a shaped body according to claim 1, characterized in that the elongate mixing element is provided in the form of an elongate rod which has a round, triangular or polygonal cross-sectional shape or which is formed as an L-, U-, or O-shaped profile.

14. Method for the layered construction of a shaped body according to claim 4, wherein the elongate mixing element comprises a plurality of parallel wires, which are moved over the tank bottom while being aligned one behind the other at the same height above the tank bottom or at different heights above the tank bottom.

15. Method for the layered construction of a shaped body according to claim 2, wherein the elongate mixing element has a resilient sealing lip over its entire length, which lip is moved over the tank bottom in contact with the tank bottom during the movement of the elongate mixing element.

16. Method for a layered construction of a shaped body made of highly viscous photopolymerizable material, in which a production platform, on a lower side of which a first layer of the shaped body to be constructed is cured, is lowered into a tank into the photopolymerizable material to a height determined so that a layer of photopolymerizable material with a predetermined layer thickness is defined between the lower side of the production platform or, if already present, a lowest cured layer of the shaped body part formed thereon and a tank bottom, the layer is exposed and cured in a desired shape by selective exposure from below through a transparent tank bottom, the production platform is raised again, an exposed region below the raised platform is replenished with photopolymerizable material and the preceding steps are repeated until a last layer of the shaped body is formed, wherein in order to replenish the exposed region below the production platform with photopolymerizable material, an elongate mixing element is moved essentially transversely to its longitudinal direction over the tank bottom, relative thereto, below the production platform through the exposed region, and wherein the mixing element has dimensions, and is moved in a positioned fashion, such that the upper edge of the mixing element remains below a material level of the photopolymerizable material, which exists outside the exposed region in the tank, at least along a part of its length, and wherein the elongate mixing element comprises regions with an enlarged cross section and a reduced cross section alternating along its length.

17. Method for a layered construction of a shaped body made of highly viscous photopolymerizable material, in which a production platform, on a lower side of which a first layer of the shaped body to be constructed is cured, is lowered into a tank into the photopolymerizable material to a height determined so that a layer of photopolymerizable material with a predetermined layer thickness is defined between the lower side of the production platform or, if already present, a lowest cured layer of the shaped body part formed thereon and a tank bottom, the layer is exposed and cured in a desired shape by selective exposure from below through a transparent tank bottom, the production platform is raised again, an exposed region below the raised platform is replenished with photopolymerizable material and the preceding steps are repeated until a last layer of the shaped body is formed, wherein in order to replenish the exposed region below the production platform with photopolymerizable material, an elongate mixing element is moved essentially transversely to its longitudinal direction over the tank bottom, relative thereto, below the production platform through the exposed region, and wherein the mixing element has dimensions, and is moved in a positioned fashion, such that the upper edge of the mixing element remains below a material level of the photopolymerizable material, which exists outside the exposed region in the tank, at least along a part of its length, wherein the elongate mixing element comprises a wire, which is held parallel to the tank bottom, over the tank bottom and movably relative thereto, and wherein the elongate mixing element comprises a plurality of parallel wires, which are moved over the tank bottom while being aligned one behind the other at the same height above the tank bottom or at different heights above the tank bottom.

18. Method for a layered construction of a shaped body made of highly viscous photopolymerizable material, in which a production platform, on a lower side of which a first layer of the shaped body to be constructed is cured, is lowered into a tank into the photopolymerizable material to a height determined so that a layer of photopolymerizable material with a predetermined layer thickness is defined between the lower side of the production platform or, if already present, a lowest cured layer of the shaped body part formed thereon and a tank bottom, the layer is exposed and cured in a desired shape by selective exposure from below through a transparent tank bottom, the production platform is raised again, an exposed region below the raised platform is replenished with photopolymerizable material and the preceding steps are repeated until a last layer of the shaped body is formed, wherein in order to replenish the exposed region below the production platform with photopolymerizable material, an elongate mixing element is moved essentially transversely to its longitudinal direction over the tank bottom, relative thereto, below the production platform through the exposed region, and wherein the mixing element has dimensions, and is moved in a positioned fashion, such that the upper edge of the mixing element remains below a material level of the photopolymerizable material, which exists outside the exposed region in the tank, at least along a part of its length, wherein the elongate mixing element is moved in a positioned fashion in such a way that the lower edge of the mixing element is in contact with the tank bottom during its movement parallel to the tank bottom, and wherein the elongate mixing element has a resilient sealing lip over its entire length, which lip is moved over the tank bottom in contact with the tank bottom during the movement of the elongate mixing element.

* * * * *